Feb. 4, 1969 W. G. LIVEZEY 3,425,296
POWER TRAIN
Filed Sept. 14, 1966

INVENTOR.
William G. Livezey
BY
Ronald L. Phillips
ATTORNEY 3,425,296
POWER TRAIN
William G. Livezey, Indianapolis, Ind., assignor to General Motors Corporation, Detroit, Mich., a corporation of Delaware
Filed Sept. 14, 1966, Ser. No. 579,420
U.S. Cl. 74—720.5          25 Claims
Int. Cl. F16h 37/06, 47/00; B62d 11/00

ABSTRACT OF THE DISCLOSURE

A power train in the preferred embodiments has a multiratio unidirectional drive unit providing drive from the power train's input to a forward and reverse drive unit. The forward and reverse drive unit is connected by a multiratio unidirectional drive unit to a pair of speed differential drive units which are coupled and are connected to drive the power train's two outputs with compound hydrodynamic braking provided in all drive ranges. In one embodiment, steer clutch drives are provided between the forward and reverse drive unit and the coupled speed differential units for steering. In another embodiment, a hydrostatic steer drive is provided between one output of the forward and reverse drive unit and the coupled speed differential units to provide infinitely variable ratio steering.

---

Figure 1:
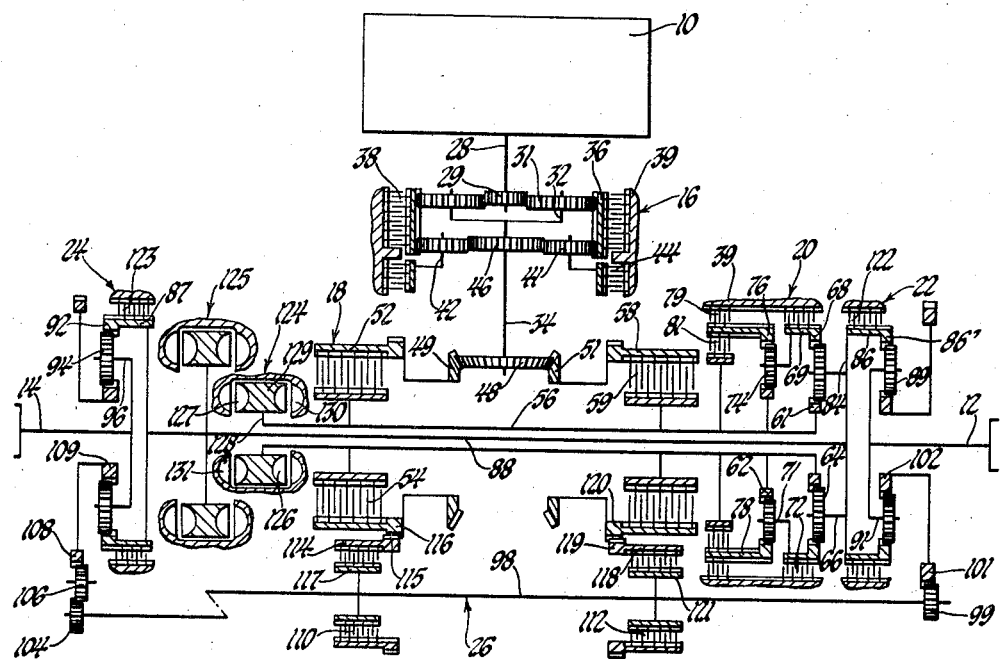

This invention relates to a power train and, more particularly, to a single input, dual output power train providing a plurality of different speed ratio propulsion output drives in two drive directions, a pivot steer drive in two directions, and a plurality of different propulsion-steer drives in two drive directions, with compound hydrodynamic braking in all drives.

In commercial vehicles and ordinance vehicles of the track-laying type with steer-by-driving, the power train matches the vehicle's prime mover to the load to propel the vehicles and also provides steerage. With the power train required to perform both these operations, it becomes exceedingly difficult to maintain the complexity of the power train at a minimum while attempting to meet the objectives of higher degrees of vehicle maneuverability. This especially arises where it is desired to provide the same propulsion drives and steerage in both the forward and reverse vehicle directions, i.e., a full reversing power train, and also provide integrated and efficient vehicle braking in all vehicle drive ranges.

The power train of the present invention employs a pair of speed differential units coupled to provide a pair of propulsion output drives having the same drive direction and speed upon provision of a propulsion input drive, a pair of steer output drives having opposite drive directions and the same speed upon provision of a steer input drive, and a pair of propulsion-steer output drives having the same drive direction and different speeds upon provision of a propulsion input drive and a steer input drive. A bidirectional drive unit is provided for selectively establishing a propulsion drive in either one of two drive directions with a unidirectional input drive from the vehicle's prime mover. A multiratio unidirectional drive unit connects the bidirectional drive unit to both speed differential units and selectively establishes a plurality of different speed ratio propulsion input drives to the speed differential units so that a plurality of selectively, establishable different speed ratio propulsion output drives in two drive directions are thereby provided. A bidirectional steer drive unit connects the prime mover to both the speed differential units and selectively establishes a steer input drive in either one of two directions to the speed differential units so that a pivot steer drive and a plurality of different propulsion-steer drives in two drive directions are selectively establishable. A pair of hydrodynamic brake units are integrated into the power train with one brake connected to the input to the multiratio drive unit and the other brake connected to the output of the multiratio drive unit and the input to the speed differential units. The brake capacities of the hydrodynamic brakes vary with the square of their operating speed and are used in combination to provide vehicle braking in all drive ranges. In addition, friction brakes are integrated into the power train to provide emergency brake operation and vehicle braking at low speeds, the friction brakes being connected to the multiratio drive unit output and the input to the speed differential units.

In one illustrative embodiment of the power train of the present invention, the vehicle's prime mover drives the input of a two-speed reduction splitter planetary gear unit. The splitter unit's output drives a bevel gear which in turn drives a pair of meshing bevel gears in opposite directions. The driven bevel gears are selectively connected by clutches to the input of a three-speed unidirectional planetary gear unit whose output drives the ring gears of a pair of like speed differential planetary gear sets, the carriers of the speed differential gear sets providing the two power train outputs to the vehicle's propelling devices which may be endless tracks. The speed differential gear units are coupled by a reversing gear train including a steer cross-shaft which gear train drive connects the sun gears of the speed differential gear units so that when the reversing gear train is free of external input drive, the steer cross-shaft receives equal and opposite torques from the speed differential sun gears and provides sun gear reaction for the ring gears to drive the carriers with the propulsion input drives to the ring gears provided by the multiratio unidirectional gear unit. With the power train components thus far described, propulsion output drives having the same drive direction and the same speed in six different speed ratio drive ranges in both the forward and reverse vehicle directions are selectively establishable, the splitter unit splitting the speed ratios of the multiratio unit to provide close ratio steps for prime mover-load matching through the vehicle speed range.

Steer input drive to the speed differential gear sets is provided by a pair of clutches which selectively connect the driven bevel gears to the steer cross-shaft whereby when the speed differential gear sets are not receiving a propulsion input drive and upon establishment of the steer input drive, the power train outputs are driven at the same speed and in opposite directions to provide what is commonly known as a true pivot steer. When the speed differential gear sets are receiving any one of the available propulsion input drives and the steer input drive to the speed differential gear sets is then established, the steer differential sun gears are driven at the same speed and in opposite direction to increase the speed of one power train output and decrease the speed of the other power train output by a like amount to provide differential steering operation.

A pair of hydrodynamic brakes are integrated into the power train with one brake connected to the input to the multiratio unit and the other brake connected to the multiratio unit's output and both ring gears of the speed differential gear sets. The hydrodynamic brakes are used simultaneously and combine to give additive braking efforts in all of the vehicle propulsion drive ranges; the hydrodynamic brake connected to the multiratio unit input providing the major portion of the braking effort in the lower drive ranges in forward and reverse, and the hydrodynamic brake connected to the multiratio unit output and the ring gears of the speed differential gear sets providing the major portion of the braking effort in the higher drive ranges in forward and reverse. Friction brakes are connected to the multiratio unit output and the ring gears of the speed differential gear sets to provide emergency braking operation and vehicle braking at low speeds.

In another embodiment of the present invention, a hydrostatic steer drive unit operatively connects the output of the splitter unit to the steer cross-shaft and provides the steer input drive via the reversing gear train to the sun gears of the speed differential gear units so that the speed of the sun gears is infinitely variable to provide infinitely variable steer ratios for steering operation.

An object of this invention is to provide a new and improved single input, dual output power train providing a plurality of different propulsion drive ranges in forward and reverse, true pivot steer operation and a propulsion-steer drive in all drive ranges.

Another object of this invention is to provide a single input, dual output power train providing a plurality of propulsion drive ranges in forward and reverse and compound hydrodynamic braking in all propulsion drive ranges.

Another object of this invention is to provide a power train employing a pair of speed differential units coupled to provide a pair of propulsion output drives having the same drive direction and speed with a propulsion input drive, a pair of steer output drives having opposite drive directions and the same speed with a steer input drive and a pair of propulsion-steer output drives having the same drive directions and different speeds with a propulsion input drive and a steer input drive.

Another object of this invention is to provide a power train employing a pair of speed differential units coupled to provide a pair of propulsion output drives with a multiratio unidirectional propulsion input drive having a selectively establishable forward and reverse input drive and propulsion-steer drives with a forward and reverse steer input drive in all propulsion drive ranges and compound hydrodynamic braking in all propulsion drive ranges.

Figure 2:
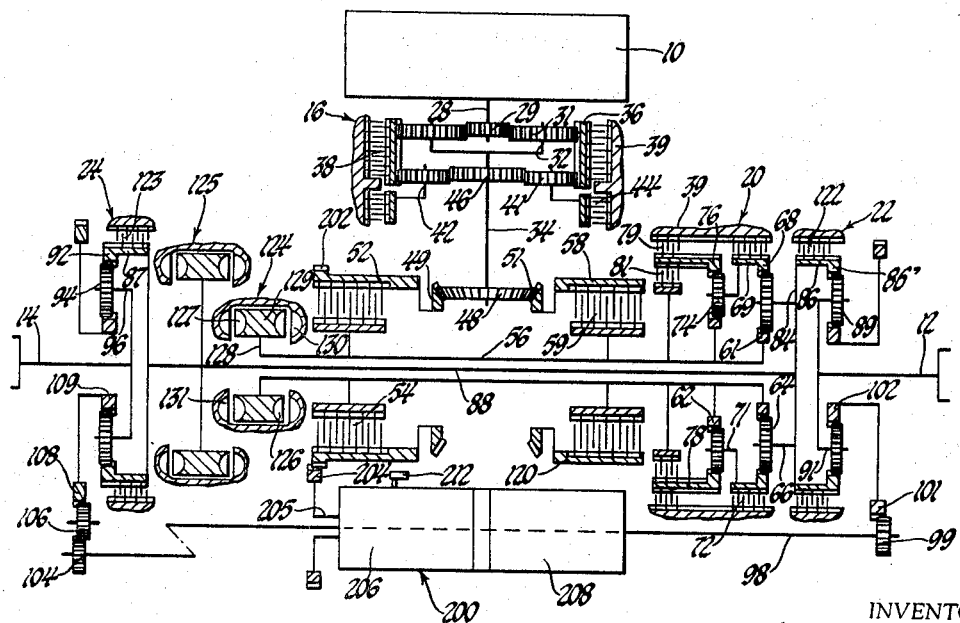

These and other objects of the present invention will be more apparent from the following description and drawing in which:

FIGURE 1 diagrammatically shows one embodiment of the power train according to the present invention;

FIGURE 2 diagrammatically shows another embodiment of the power train according to the present invention.

Referring first to the vehicular power train embodiment illustrated in FIGURE 1, the prime mover 10, which may be a free turbine, is operatively drive connected to the coaxial power train output shafts 12 and 14 by drive train means including a two-speed unidirectional splitter planetary gear unit 16 which provides a selection of two unidirectional input drives to a forward and reverse drive unit 18. The output shafts, in the case of track-laying vehicles, would be connected by sprocket drives to the vehicle's endless tracks. The forward and reverse drive unit 18 provides a selective forward and reverse propulsion drive input to a three-speed unidirectional planetary gear unit 20 whose output provides the propulsion input to a pair of like speed differential planetary gear units 22 and 24; the respective outputs of the latter units being connected to the output shafts 12 and 14. Steer input drive to the speed differential gear units 22 and 24 is provided by a reversing drive gear train 26 which couples the speed differential units to provide reaction for propulsion drive and is clutchable to the forward and reverse drive unit 18 to selectively transmit opposite directional drive in either one of two drive directions to both the speed differential gear units for establishing steer bias for the steering operations. The central and coaxial axes of the prime mover 10 and the splitter gear unit 16 are arranged for location longitudinally of the vehicle and the central axes of the units 20, 22, and 24 are transverse to the axes of the units 10 and 16 and arranged for location transversely of the vehicle.

Describing these components and their power train connections in detail, prime mover 10 has its output shaft 28 connected to the sun gear 29 of the forward planetary gear set in gear unit 16. Sun gear 29 meshes with pinions 31 which are journalled on a carrier 32 connected to the gear unit's output shaft 34. Pinions 31 mesh with the internal teeth of a ring gear 36 which can be held by engagement of a high splitter brake 38 whose reaction is taken by the power train housing 39 which houses all the power train components. Ring gear 36 also serves the rear planetary gear set whose pinions 41 are in mesh with ring gear 36 and journalled on a carrier 42 which can be held by engagement of a low splitter brake 44 grounded on the power train housing. Pinions 41 mesh with a sun gear 46 connected to the gear unit's output shaft 34. With the power train input shaft 28 providing a unidirectional input drive to the splitter unit 16 and upon engagement of the low splitter brake 44, the forward gear set combines with the rear gear set to drive the output shaft 34 in the same direction as input shaft 28 and at a reduced speed to provide a low splitter speed ratio. Alternatively, when the high splitter brake 38 is engaged, the forward gear set provides simple planetary gear action to drive the output shaft 34 in the same direction as input shaft 28 and at a reduced speed to provide a high splitter speed ratio providing less speed reduction than the low splitter speed ratio.

In the forward and reverse drive unit 18, the splitter unit's output shaft 34 is connected to a bevel gear 48 which meshes at diametrically opposite sides and at right angles with a forward drive bevel side gear 49 and a reverse drive bevel side gear 51. The gears 49 and 51 are suitably supported for rotation about an axis coaxial with the axis of three-speed unit 20. Forward drive gear 49 is connected to a forward drive drum 52 which is connected by engagement of a forward drive clutch 54 to a sleeve cross-shaft 56. The reverse drive bevel gear 51 is connected to a reverse drive drum 58 which is connected by engagement of a reverse drive clutch 59 to the cross-shaft 56. Thus, with the two splitter speed ratios of splitter unit 16 and the forward and reverse drives of the unit 18 provided by alternative engagement of drive clutches 54 and 59, two forward and two reverse speed ratio drives are available to drive cross-shaft 56 with the unidirectional input drive to the power train.

Cross-shaft 56 transmits input to three-speed unit 20 and is connected to sun gear 61 of the rear planetary gear set and the larger sun gear 62 of the forward planetary gear set. Sun gear 61 meshes with pinions 64 journalled on a carrier 66 which receives the output of the unit. Ring gear 68 meshes with pinions 64 and is integral with a drum 69 connected to the carrier 71 of the forward gear set and to a low drive brake 72 grounded on the power train housing. Low drive brake 72, when engaged, holds ring gear 64 to establish a low speed ratio drive through the rear gear set to drive the output carrier 66 in the same direction as the input shaft 56 and at a reduced speed. Sun gear 62 meshes with pinions 74 journalled on a carrier 71. A ring gear 76 meshes with pinons 74 and is integral with a drum 78 which is held by engagement of an intermediate drive brake 79 whose reaction is taken by the power train housing and is connected to input shaft 56 by engagement with a high drive clutch 81. When intermediate drive brake 79 is engaged, the forward gear set combines with the rear gear set to provide an intermediate speed ratio drive having less speed reduction than the low speed ratio drive to drive output carrier 66 in the same direction as input shaft 56. A high speed ratio drive in the unit 20 is established by engagement of the high clutch 81 which locks up the rear gear set to establish a direct or 1:1 speed ratio drive between the input shaft 56 and the output carrier 66. Thus, the output of unit 20 can be selectively driven with six different forward and reverse speed ratio drives observing that the splitter unit 16 serves to split the ratios of unit 20.

The output carrier 66 of unit 20 transmits propulsion input drive for both speed differential units 22 which have like planetary gear sets. The output carrier 66 of unit 20 is connected by the hub 84 of a drum 86 to one end of a cross-shaft 88 extending through sleeve shaft 56, the other end of the shaft 88 being connected to the hub of a similar drum 87. In unit 22, a ring gear 86' integral with drum 86 meshes with pinions 89 journalled on an output carrier 91 connected to the power train output shaft 12. Similarly, in unit 24, a ring gear 92 integral with drum 87 meshes with pinions 94 journalled on an output carrier 96 connected to the power train output shaft 14.

The speed differential planetary gear sets are coupled by the reversing drive train 26 which has a steer cross-shaft 98 offset from and parallel to the coaxial axes of units 22 and 24. Steer shaft 98 is connected to a spur gear 99 in mesh with an annular spur gear 101 which is received on the power train output shaft 12 and connected to sun gear 102 in mesh with pinions 89 in unit 22. The other end of steer shaft 98 is connected to a spur gear 104 in mesh with an idler gear 106. Gear 106 meshes with an annular spur gear 108 which is received on the power trains output shaft 14 and connected to sun gear 109 in mesh with the pinions 94 in unit 24. The driving gear connections of steer shaft 98 with the sun gears 102 and 109 have equal ratios so that the shaft 98 will receive equal and opposite torques and provide reaction for the drive of the speed differential carriers 91 and 96 by their respective ring gears 86' and 92.

The steer drive to the reversing drive train 26 and thus to the units 22 and 24 is provided by alternative engagement of a steer clutch 110 and 112 which clutches are concentrically located about the steer shaft 98. Clutch 110 comprises a driving drum 114 having an integral spur gear 115 in mesh with a spur gear 116 integral with the forward drive drum 52 and a driven drum 117 connected to steer shaft 98 having clutch plates intermediate the clutch plates of drum 114. When clutch 110 is engaged, the forward drive drum 52 drives the clutched steer shaft 98 in the opposite direction and the speed differential sun gears 102 and 109 are driven in opposite directions at the same speed. The other steer clutch 112 has a driving drum 118 having an integral spur gear 119 in mesh with a spur gear 120 integral with the reverse drive drum 58 and a driven drum 121 connected to steer shaft 98 having clutch plates intermediate the clutch plates of drum 118. When clutch 112 is engaged, the reverse drive drum 58 drives the clutched steer shaft 98 in the opposite direction and the speed differential sun gears 102 and 109 are driven in opposite directions at the same speed, the sun gear drive directions with clutch 112 engaged being opposite their drive directions with the other steer clutch 110 engaged. Thus, the bevel gear unit serves as a reversing drive link for both the propulsion and steer drives.

Braking is provided by a pair of friction brakes 122 and 123 and a pair of hydrodynamic brake units 124 and 125. The friction brakes 122 and 123 are connected to drums 86 and 87, respectively, and take their reaction on the power train housing and upon engagement, equally share the braking loads of the connected ring gears 86' and 92.

The hydrodynamic brake 124 is for braking the input shaft 56 of unit 20 and comprises two series of rotor vanes 126 and 127 which are mounted on a hub 128 connected to shaft 56 and located in a brake chamber 129 provided in the power train housing. Two annular series of vanes 130 and 131 mounted on the housing in chamber 129 provide the stator elements of the hydrodynamic brake for the rotor elements 126 and 127, respectively. Hydrodynamic brake 124 is effective to retard the rotation of shaft 56 upon the controlled supply of fluid to brake chamber 129, the brake providing a braking effort proportional to the square of the speed of shaft 56. The other hydrodynamic brake 125 has a brake construction similar to brake 124 and is connected to shaft 88 and thus the output of unit 20 and the input to the speed differential units 22 and 24, the brake 125 thereby being effective to provide a braking effort proportional to the square of the speed of shaft 88. The controlled supply of fluid to both hydrodynamic brakes 124 and 125 may be accomplished in any suitable known manner, such as by the hydrodynamic brake control system explained in detail in United States Patent 2,864,473, Howard W. Christenson et al. The brake characteristics are discussed in greater detail in the description of overall power train operation which follows.

The drive establishing brakes and clutches employed in the power train are conventional friction engaging devices and may be actuated in any known way, i.e., electrically, hydraulically, pneumatically, or by some mechanical provision, and in a certain sequence. The following operational summary illustrates the power train operation available.

The power train in FIGURE 1 may be operated to provide six propulsion drive ranges in forward and reverse, true pivot steer and differential steer in each propulsion drive range. The first forward propulsion drive range, which is considered the lowest drive range and provides the greatest torque multiplication, is established by engaging the low splitter brake 44, the forward drive clutch 54, and the low drive brake 72, all other drive establishing devices being disengaged. The steer shaft 98 and thus the reversing drive train is free of any external drive. The speed differential ring gears 86' and 92 are driven in the forward direction with the lowest available speed ratio drive. The steer shaft 98 receives equal and opposite torques from the speed differential sun gears 102 and 109 and thereby provides both these sun gears with reaction for the ring gear drive to the output carriers and connected power train output shafts.

The five higher forward propulsion drive ranges are obtained by establishing higher speed ratio drives to the speed differential ring gears by operation of units 16 and 20 while the forward drive clutch 54 remains engaged and with reaction continuing at the speed differential sun gears. The next higher or second forward propulsion drive range is established by merely upshifting the splitter unit from the low splitter ratio to the high splitter ratio by disengaging low splitter brake 44 and engaging the high splitter brake 38. This operation splits the low speed ratio drive of unit 20 to provide a higher speed ratio drive to the speed differential ring gears 86' and 92 and thus a higher overall power train speed ratio drive between the power train input and outputs. The third forward propulsion drive range requires a double transition shift with the splitter unit 16 being downshifted to provide the low splitter ratio and unit 20 being upshifted to provide its intermediate speed ratio drive so that a higher speed drive is provided to the speed differential ring gears. The fourth forward propulsion drive range is established by merely upshifting the splitter unit 16 to provide the high splitter ratio while unit 20 retains its prior condition and thereby has its intermediate speed ratio drive split to provide a higher speed ratio drive to the speed differential ring gears. Shifting from the fourth to the fifth forward propulsion drive range requires a double transition shift with splitter unit 16 being conditioned to provide the slow splitter ratio and the unit 20 conditioned to provide its high speed ratio drive so that a higher speed ratio drive is provided to the speed differential ring gears. Shifting from the fifth to the sixth forward propulsion drive range requires merely an upshift in the splitter unit 16 to the high splitter speed ratio to split the high speed ratio drive of unit 20 whereby the highest speed ratio drive to the speed differential ring gears is provided.

Differential steering operation in the first forward propulsion drive range is obtained by driving the steer shaft 98 in one direction or the other, dependent upon the direction of turn desired. For example, if a right turn is desired, the steer clutch 112 is engaged so that the splitter unit output drive established by the low splitter speed ratio is transmitted by the engaged clutch 112 to drive the speed differential sun gear 102 in the reverse direction opposite the forward direction of the driving ring gear 86′ while at the same time driving the other speed differential sun gear 109 in the same direction as the forwardly rotating ring gear 92 and at the same speed as sun gear 102. This effects a differential steering action between the power train output shafts 12 and 14 with output shaft 14 with its propulsion-steer drive being speeded up by the same amount that the speed of the opposite output shaft 12 is diminished by its propulsion-steer drive. Alternatively, a left steer with similar steering operation is obtained by engaging steer clutch 110.

Differential steering is available in the five higher drive ranges by selective operation of the steer clutches 110 and 112, as described above for the first forward propulsion drive range, recognizing that the speed added to one power train output shaft will be equal to the speed subtracted from the opposite power train output shaft while the connected speed differential ring gears continue to rotate forwardly with their input drive. It will also be recognized that the steer input speed ratio drive to the speed differential sun gears will be higher in the second, fourth and sixth propulsion drive ranges since the splitter unit is upshifted to its high splitter speed ratio in these drive ranges. The vehicle's turn radius, which is determined by the ratio of the speeds of the power train output shafts 12 and 14, is small in the first drive range, is increased in the third drive range and is further increased in the fifth drive range. In the second, fourth and sixth drive ranges, the turn radius also increases upon upshifting from a lower to a higher one of these drive ranges and, dependent on the ratio steps of the units 16 and 20, may be either intermediate, above or below the turn radius provided in the immediately preceding or succeeding drive range.

Since the forward and reverse drive unit 18 can reverse the input drive direction to unit 20, the same drive ranges and steering operation provided for forward vehicle movement, as described above, are also available for reverse vehicle movement. Thus, full reversing operation is simply provided by disengaging the forward drive clutch 54, engaging the reverse drive clutch 59, and operating the other power train components as discussed before with proper selective engagement of the steer clutches 110 and 112 providing the desired direction of vehicle turn.

True pivot steer operation in two-speed ranges is provided by the power train by disengaging both the forward and reverse drive clutches 54 and 59 and all drive establishing devices in unit 20. Low speed pivot steer operation is then available by engaging the low splitter brake 44 and either one of the steer clutches 110 or 112, dependent upon the direction of turn desired. For example, if steer clutch 112 is engaged, the speed differential sun gear 102 is driven in the reverse direction and the opposite speed differential sun gear 109 is driven in the forward direction at the same speed. Since the speed differential ring gears 92 and 86′ are connected and receive equal and opposite torques from the sun gear drives, they provide reaction for the speed differential gear units with the result that the power train output shaft 14 is driven in the forward direction and the power train output shaft 12 is driven in the opposite or reverse direction and at the same speed resulting in a true vehicle pivot turn to the right. Alternatively, engagement of the steer clutch 110 will provide a true left pivot turn. A higher speed pivot turn is available by upshifting the splitter unit to the high splitter ratio by disengagement of the low splitter brake 44 and engagement of the high splitter brake 38 and alternative engagement of the steer clutches 110 and 112 to provide the desired direction of vehicle turn.

Hydrodynamic braking is available in each propulsion drive range in forward and reverse by simultaneous control of both hydrodynamic brakes 124 and 125. With hydrodynamic brake 124 connected to the input shaft 56 of unit 20, it provides a braking effort on the power train output shafts 12 and 14 which is proportional to the square of the input speed of unit 20 and, accordingly, increases at an exponential rate with increasing vehicle speed in each forward and reverse propulsion drive range and progresively decreases on each upshift since the input speed of unit 20 progressively decreases on each upshift. With hydrodynamic brake 125 connected to cross-shaft 88, it provides a braking effort which is proportional to the square of the output speed of unit 20 and, accordingly, increases at an exponential rate with increasing vehicle speed as the power train is upshifted through the six propulsion drive ranges both in forward and reverse and reaches its peak at the terminal vehicle speed. Since hydrodynamic brake 124 provides decreasing braking effort on each upshift and the hydrodynamic brake 125 provides increasing braking effort on each upshift, hydrodynamic brake 124 provides the major portion of the combined hydrodynamic braking effort in the lower drive ranges and hydrodynamic brake 125 provides the major portion of the combined hydrodynamic braking effort in the higher drive range in forward and reverse. The friction brakes 122 and 123 are engaged as the vehicle speed approaches zero to compensate for the loss of braking effort in the hydrodynamic brakes and also may be used for emergency braking.

In the FIGURE 1 embodiment, the steering ratio is fixed in all drive ranges. In the FIGURE 2 embodiment, which has parts corresponding to the parts shown in FIGURE 1 identified by like numerals, there is provided an infinitely variable steer ratio in each drive range which is made available by the integration of an infinitely variable speed ratio hydrostatic drive unit 200 for selectively transmitting drive to the steer shaft 98. In the hydrostatic drive train, either one of the drive drums of unit 18 and in the illustrated embodiment, the forward drive drum 52, is provided with an integral spur gear 202 which meshes with a spur gear 204 received on steer shaft 98. Gear 204 is connected to the input sleeve shaft 205 of the hydrostatic pump 206, sleeve shaft 205 being freely received on steer shaft 98. Pump 206 is hydraulically connected to the hydrostatic motor 208 which is operatively connected to the steer shaft 98, the hydrostatic unit being concentrically located about steer shaft 98. The hydrostatic unit 200 may be of the form disclosed in copending application Ser. No. 279,372, filed May 10, 1963, now Patent No. 3,273,344, of Howard W. Christenson et al., with the motor 208 having a fixed displacement, and the pump 206 having a variable displacement controlled by a displacement control mechanism. The displacement control mechanism is operated by lever 212 whereby the motor output and connected steer shaft 98 may be free of hydrostatic drive or driven in a forward or reverse direction at infinitely variable speeds.

Since the FIGURE 2 propulsion drive trains are the same as the FIGURE 1 propulsion drive trains, the FIGURE 2 power train embodiment with the steer shaft 98 free of hydrostatic drive provides the same propulsion drive range operation in forward and reverse as the FIGURE 1 power train embodiment. The following operational summary is to aid the understanding of the hydrostatically controlled steer provided in each propulsion drive range and in neutral.

True pivot steer operation with the power train conditioned for neutral, which condition is obtained as discussed previously relative to the FIGURE 1 embodiment, is obtained by operating the pump control 212 so that the hydrostatic motor 208 drives the steer shaft 98 in a direction to produce the desired turn direction. One of the speed differential sun gears is driven in the forward direction and the opposite speed differential sun gear is driven in the reverse direction and at the same speed. Since the speed is determined by the displacement of the pump 206, infinitely variable speed pivot steering operation is provided.

During each of the propulsion drive ranges, the hydrostatic unit 200 is conditioned by control 212 to permit free rotation of the steer shaft 98 with respect to the hydrostatic unit. When it is desired to turn the vehicle in any one of the forward and reverse propulsion drive ranges, the hydrostatic unit is controlled by control 212 to drive the steer shaft 98 in a direction to produce the desired turn direction. This operation drives one of the speed differential sun gears in the forward direction and the opposite speed differential sun gear in the reverse direction and at the same speed. Their speed is determined by the operator controlling the displacement of the hydrostatic pump to establish a hydrostatically controlled speed ratio to produce the rate of vehicle turn desired, recognizing that in each propulsion drive range, the speed added to one of the power train outputs by its driving speed differential sun gear will be equal to the speed subtracted by the opposite speed differential sun gear from the opposite power train output shaft while the driving speed differential ring gears continue to be driven at the speed determined by the acting propulsion drive range ratio. Thus, the steer radius in each propulsion drive range is under positive control and is infinitely variable in all forward and reverse propulsion drive ranges, which provides for an infinite selection of differential steer ratios in each propulsion drive range as compared with the FIGURE 1 power train embodiment.

The above-described preferred embodiments are illustrative of the invention, which may be modified within the scope of the appended claims.

What is claimed is:

1. In a power train, the combination of an input shaft; a pair of output shafts; a pair of speed differential units, each drive connected to one output shaft; coupling means operatively coupling said spaced differential units operable to provide reaction for and to transmit steer drive in opposite drive directions to said speed differential units; a first multiratio unidirectional drive unit operatively drive connected to both said speed differential units; propulsion drive transmitting means including a forward and reverse drive direction unit operatively drive connecting said input shaft to said multiratio unidirectional drive unit; steer drive transmitting means including steer drive direction determining means operatively drive connecting said input shaft to said coupling means; and said propulsion drive transmitting means and said steer drive transmitting means having a common second multiratio unidirectional drive unit.

2. The power train set forth in claim 1 and said steer drive direction determining means including a steer clutch drive train operable to provide one steer drive direction and a steer clutch drive train operable to provide an opposite steer drive direction.

3. The power train set forth in claim 1 and said steer drive direction determining means including a hydrostatic unit operable to provide an infinitely variable ratio steer drive in one direction and in the opposite direction.

4. The power train set forth in claim 1 and said forward and reverse drive direction unit including a driving bevel gear meshing at diametrically opposite sides with a pair of driven bevel gears, a forward drive clutch for connecting one driven bevel gear to said first multiratio unidirectional drive unit, a reverse drive clutch for connecting the other driven bevel gear to said first multiratio unidirectional drive unit.

5. The power train set forth in claim 4 and said steer drive direction determining means including a steer clutch for connecting one driven bevel gear to said coupling means, a steer clutch for connecting the other driven bevel gear to said coupling means.

6. The power train set forth in claim 4 and said steer drive direction determining means including an infinitely variable hydrostatic unit for connecting one driven bevel gear to said coupling means.

7. In a power train, the combination of an input shaft; a pair of output shafts; a pair of speed differential units, each drive connected to one output shaft; coupling means operatively coupling said speed differential units operable to provide reaction for and to transmit steer drive in opposite drive directions to said speed differential units; a multiratio unidirectional drive unit operatively drive connected to both said speed differential units; propulsion drive transmitting means including a forward and reverse drive direction unit operatively drive connecting said input shaft to said multiratio unidirectional drive unit; steer drive transmitting means including steer drive direction determining means operatively drive connecting said input shaft to said coupling means; and said multiratio unidirectional drive unit having an input driving member connected to a hydrodynamic brake and an output driven member connected to a hydrodynamic brake.

8. The power train set forth in claim 7 and said steer drive direction determining means including a steer clutch drive train operable to provide one steer drive direction and a steer clutch drive train operable to provide an opposite steer drive direction.

9. The power train set forth in claim 7 and said steer drive direction determining means including a hydrostatic unit operable to provide an infinitely variable ratio steer drive in one direction and in the opposite direction.

10. The power train set forth in claim 7 and said forward and reverse drive direction unit including a driving bevel gear meshing at diametrically opposite sides with a pair of driven bevel gears, a forward drive clutch for connecting one driven bevel gear to said multiratio unidirectional drive unit, a reverse drive clutch for connecting the other driven bevel gear to said multiratio unidirectional drive unit.

11. The power train set forth in claim 10 and said steer drive direction determining means including a steer clutch for connecting one driven bevel gear to said coupling means, a steer clutch for connecting the other driven bevel gear to said coupling means.

12. The power train set forth in claim 10 and said steer drive direction determining means including an infinitely variable hydrostatic unit for connecting one driven bevel gear to said coupling means.

13. In a power train, the combination of a pair of speed differential means operatively coupled to provide a pair of propulsion output drives having the same drive direction and the same speed upon provision of a propulsion input drive, a pair of steer output drives having opposite drive directions and the same speed upon provision of a steer input drive, and a pair of propulsion-steer output drives having the same drive direction and different speeds upon provision of a propulsion input drive and a steer input drive; an input member for transmitting a unidirectional input drive; propulsion direction determining drive means operatively connected to said input member for selectively establishing a forward direction drive and a reverse direction drive with the unidirectional input drive; multiratio unidirectional drive means operatively connecting said propulsion direction determining drive means to both said speed differential means for selectively establishing a plurality of unidirectional speed ratio drives to transmit propulsion input drive to both said speed differential output means whereby a plurality of selectively establishable forward and reverse propulsion output drives is provided; steer drive means operatively connected to said input member and both said speed differential output means for selectively transmitting a steer input drive in one drive direction and a steer input drive in the opposite drive direction to both said speed differential output means whereby a selectively establishable steer drive and a plurality of selectively establishable propulsion-steer drives for turning in one direction and in the opposite direction are provided; and said multiratio unidirectional drive means having input means connected to a hydrodynamic brake and output means connected to a hydrodynamic brake.

14. The power train set forth in claim 13 and said steer drive means provided by all mechanical drive means including a clutch drive train operable to provide one steer drive direction and a clutch drive train operable to provide an opposite steer drive direction.

15. The power train set forth in claim 13 and said steer drive means including hydrostatic drive means for selectively providing an infinitely variable speed ratio steer input drive in one drive direction and an infinitely variable speed ratio steer input drive in the opposite drive direction.

16. The power train set forth in claim 13 and said propulsion direction determining drive means including a driving bevel gear meshing at diametrically opposite sides with a pair of driven bevel gears, a forward drive clutch for connecting one driven bevel gear to said multiratio unidirectional drive means, a reverse drive clutch for connecting the other driven bevel gear to said multiratio unidirectional drive means.

17. The power train set forth in claim 16 and said steer drive means including a steer clutch for establishing steer drive through one driven bevel gear, a steer clutch for establishing steer drive through the other driven bevel gear.

18. The power train set forth in claim 16 and said steer drive means including an infinitely variable hydrostatic unit for establishing steer drive through one driven bevel gear.

19. In a power train, the combination of a pair of speed differential means operatively coupled to provide a pair of propulsion output drives having the same drive direction and the same speed upon provision of a propulsion input drive, a pair of steer output drives having opposite drive directions and the same speed upon provision of a steer input drive, and a pair of propulsion-steer output drives having the same drive direction and different speeds upon provision of a propulsion input drive and a steer input drive; an input member for transmitting a unidirectional input drive; propulsion direction determining drive means operatively connected to said input member for selectively establishing a forward direction drive and a reverse direction drive with the unidirectional input drive; a first multiratio unidirectional drive means operatively connecting said propulsion direction determining drive means to both said speed differential means for selectively establishing a plurality of unidirectional speed ratio drives to transmit propulsion input drive to both said speed differential output means whereby a plurality of selectively establishable forward and reverse propulsion output drives is provided; steer drive means operatively connected to said input member and both said speed differential output means for selectively transmitting a steer input drive in one drive direction and a steer input drive in the opposite drive direction to both said speed differential output means whereby a selectively establishable steer drive and a plurality of selectively establishable propulsion-steer drives for turning in one direction and in the opposite direction are provided; and a second multiratio unidirectional drive means operatively drive connecting said input member to said propulsion direction determining drive means for selectively establishing a plurality of unidirectional input speed ratio drives to said propulsion direction determining drive means.

20. The power train set forth in claim 19 and said steer drive means provided by all mechanical drive means including a clutch drive train operable to provide one steer drive direction and a clutch drive train operable to provide an opposite steer drive direction.

21. The power train set forth in claim 19 and said steer drive means including hydrostatic drive means for selectively providing an infinitely variable speed ratio steer input drive in one drive direction and an infinitely variable speed ratio steer input drive in the opposite drive direction.

22. The power train set forth in claim 19 and said propulsion direction determining drive means including a driving bevel gear meshing at diametrically opposite sides with a pair of driven bevel gears, a forward drive clutch for connecting one driven bevel gear to said first multiratio unidirectional drive means, a reverse drive clutch for connecting the other driven bevel gear to said first multiratio unidirectional drive means.

23. The power train set forth in claim 22 and said steer drive means including a steer clutch for establishing steer drive through one driven bevel gear, a steer clutch for establishing steer drive through the other driven bevel gear.

24. The power train set forth in claim 22 and said steer drive means including an infinitely variable hydrostatic unit for establishing steer drive through one driven bevel gear.

25. In a power train, the combination of a pair of speed differential means operatively coupled to provide a pair of propulsion output drives having the same drive direction and the same speed upon provision of a propulsion input drive, a pair of steer output drives having opposite drive directions and the same speed upon provision of a steer input drive, and a pair of propulsion-steer output drives having the same drive direction and different speeds upon provision of a propulsion input drive and a steer input drive; an input member for transmitting a unidirectional input drive; propulsion direction determining drive means operatively connected to said input member for selectively establishing a forward direction drive and a reverse direction drive with the unidirectional input drive; first multiratio unidirectional drive means operatively connecting said propulsion direction determining drive means to both said speed differential means for selectively establishing a plurality of unidirectional speed ratio drives to transmit propulsion drive to both said speed differential output means whereby a plurality of selectively establishable forward and reverse propulsion output drives is provided; steer drive means operatively connected to said input member and both said speed differential output means for selectively transmitting a steer input drive in one drive direction and a steer input drive in the opposite drive direction to both said speed differential output means whereby a selectively establishable steer drive and a plurality of selectively establishable propulsion-steer drives for turning in one direction and in the opposite direction are provided; and second multiratio unidirectional drive means operatively drive connecting said input member to both said propulsion direction determining drive means and said steer drive means.

References Cited

UNITED STATES PATENTS

| 2,377,354 | 6/1945 | Merritt | 74—720.5 X |
| 2,930,257 | 3/1960 | Christenson | 74—720.5 |
| 3,199,376 | 8/1965 | De Lalio | 74—720.5 |
| 3,250,151 | 5/1966 | Binger | 74—720.5 |

FOREIGN PATENTS

| 79,913 | 12/1950 | Czechoslovakia. |
| 1,147,142 | 10/1960 | France. |

DONLEY J. STOCKING, *Primary Examiner.*

THOMAS C. PERRY, *Assistant Examiner.*

U.S. Cl. X.R.

180—6.7; 192—4